March 22, 1966   J. H. DOSS   3,241,346
METHOD OF EXTRUDING, USING A SELF-ADJUSTING MANDREL
Original Filed March 16, 1961   2 Sheets-Sheet 1

INVENTOR.
BY Joseph H. Doss
Linton and Linton
ATTORNEYS

March 22, 1966   J. H. DOSS   3,241,346
METHOD OF EXTRUDING, USING A SELF-ADJUSTING MANDREL
Original Filed March 16, 1961   2 Sheets-Sheet 2
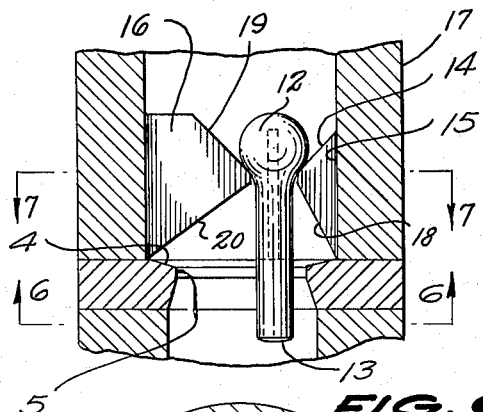
FIG. 5.
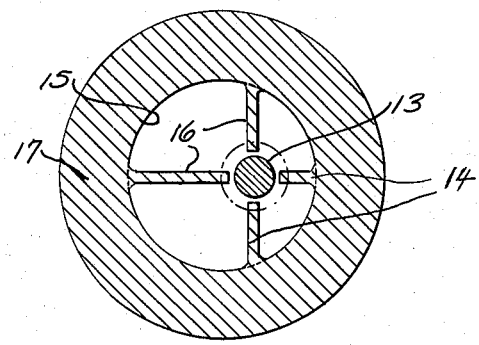
FIG. 7.
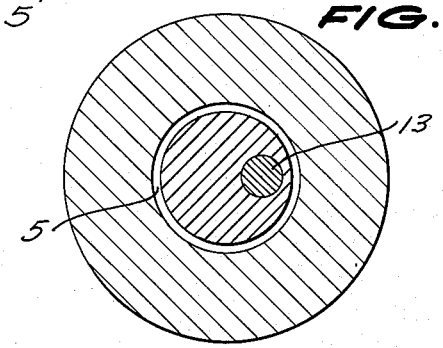
FIG. 6.
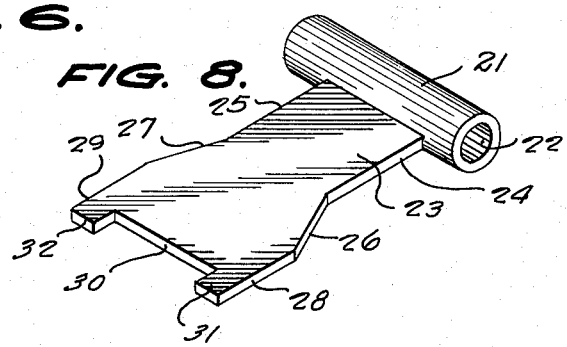
FIG. 8.
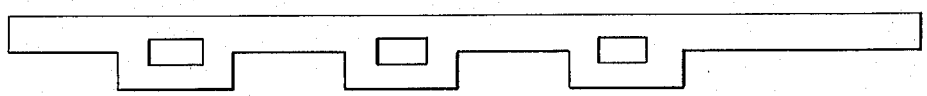
FIG. 9.
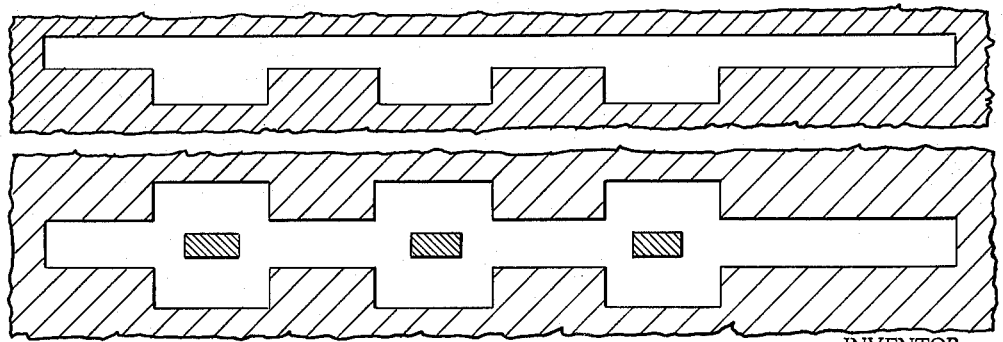
FIG. 10.
FIG. 11.
INVENTOR.
BY Joseph H. Doss
Linton and Linton
ATTORNEYS United States Patent Office 3,241,346
Patented Mar. 22, 1966

3,241,346
METHOD OF EXTRUDING, USING A SELF-ADJUSTING MANDREL
Joseph H. Doss, 4744 12th St., Detroit 8, Mich.
Continuation of application Ser. No. 96,228, Mar. 16, 1961. This application May 18, 1964, Ser. No. 369,357
3 Claims. (Cl. 72—264)

This specification is a continuation of pending United States application No. 96,228 filed March 16, 1961, now abandoned, by the same Joseph H. Doss.

The present invention relates to the structure of and the use of a freely suspended mandrel for the extrusion of hollow shapes composed of metal or metallic alloys, and to the use of this mandrel to produce and maintain extremely small dimensional tolerances with respect to the inner and outer dimensions of said hollow shapes.

The principal object of the invention is to provide an apparatus capable of producing inner dimensions of hollow extruded shapes, said dimensions to vary by not more than .0005 of an inch, over extensive periods of continuous extrusion. A second object of the invention is the extrusion of hollow shapes, the dimensions of which vary by not more than .0005, this dimensional tolerance controlled by and only by the rate of flow of the extruded material.

A third object of the invention is the use of a mandrel of which the bearing surface of the supporting member is shaped in spherical curvature in at least one direction. Such a mandrel is free to adjust its position solely under the influence of pressures generated entirely within the material being extruded.

A fourth object is to provide an advance over the prior art in which the mandrel is positioned by mechanical means which deflect in uncoordinated ways under the varying conditions of temperature and pressure which occur during the process of extrusion, thus requiring constant manual readjustment. In the present advance in the art, all mechanical readjustment is eliminated.

Figure 1:
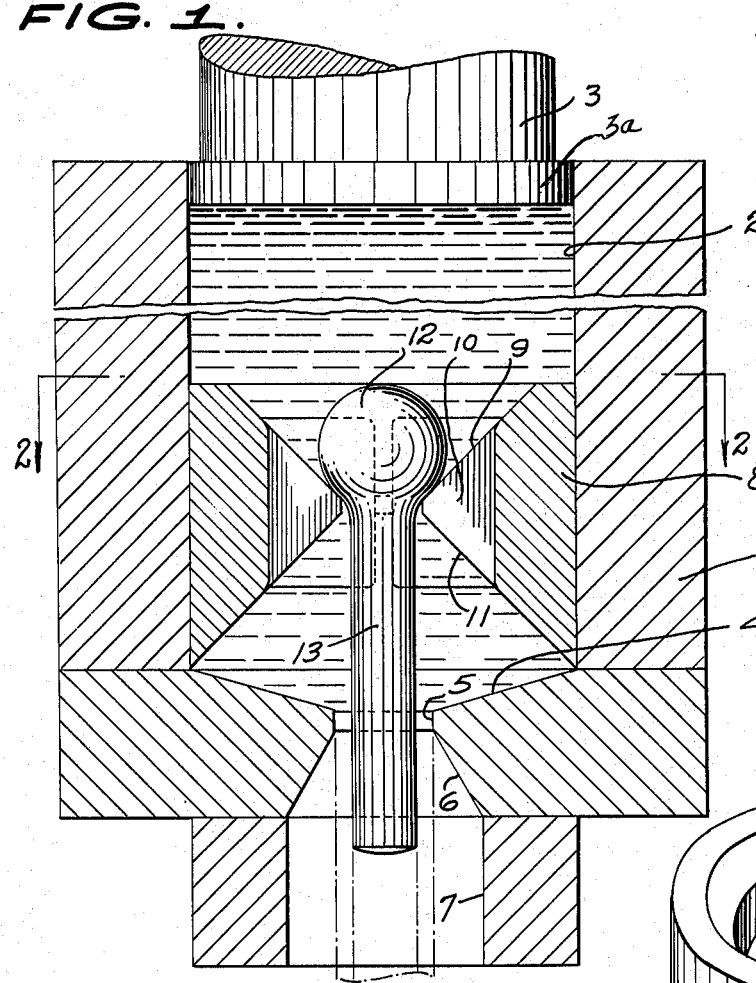

Further objects of the invention will be in part obvious and in part pointed out in the following description of the accompanying drawings. FIGURE 1 is a vertical cross section of that part of a press for the extrusion of hollow shapes which contains the means for the positioning of the mandrel which creates the cavity of a hollow shape, and which also contains the die through which the material is to be extruded, the drawing showing the configuration of these parts for the continuous extrusion of a round tube of constant dimensions.

Figure 4:
Figure 2:
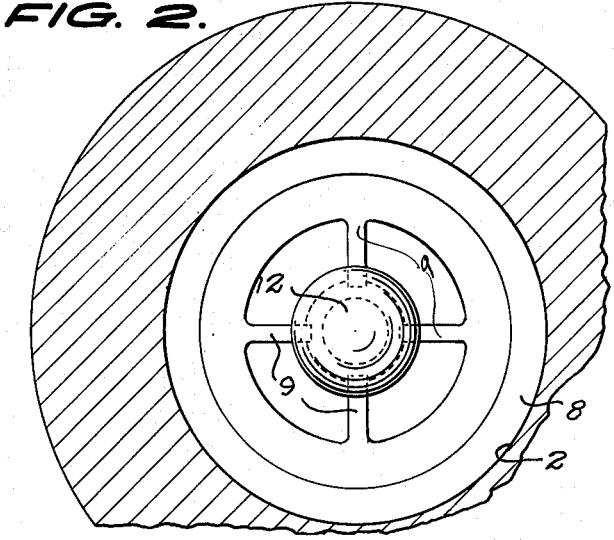
Figure 3:
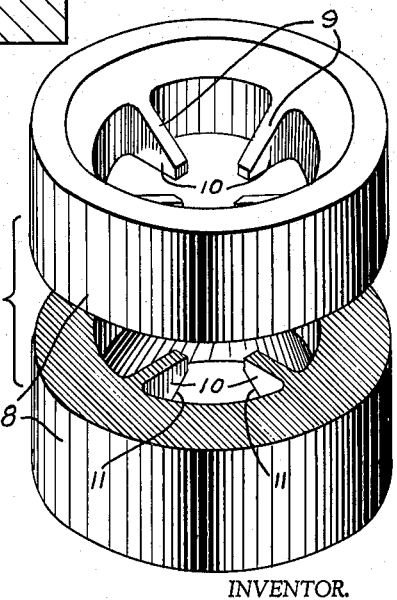

FIGURE 2 is a lateral cross section of the same press, taken on section line 2—2 from FIGURE 1. FIGURE 3 is an exploded view in perspective of that part of the extrusion press shown in FIGURES 1 and 2 which contains the means for the positioning of the mandrel, showing that part of the press as though it consists of two pieces while in fact it is only one piece. FIGURE 4 is the piece extruded from the press shown in FIGURES 1, 2, and 3, with the shape and position of the extruded shape shown by phantom lines at the bottom of FIGURE 1.

FIGURE 5 is the vertical cross section of the press shown in FIGURES 1, 2, and 3, in the configuration for the continuous extrusion of hollow shapes in which the cavity is off-centered, in simplified depiction. FIGURE 6 shows a lateral cross section of the press of FIGURE 5, taken on section line 6—6 of FIGURE 5. FIGURE 7 is a lateral cross section of FIGURE 5, taken on section line 7—7 of FIGURE 5. Thus FIGURE 7 has the same relation to FIGURE 5 that FIGURE 2 has to FIGURE 1.

FIGURE 8 shows a mandrel with cylindrical top section combined with a strip mandrel stem which terminates in two mandrel stems at that point in the apparatus where the separate mandrel stem ends pass through the die, thus producing a hollow shape with a plurality of cavities.

FIGURES 9, 10, and 11 all relate to the multiple cavity extrusion. Thus FIGURE 9, a cross section of such an extruded piece; FIGURE 10, a cross section of the die required to produce the piece shown in FIGURE 9; and FIGURE 11, the combination of die and mandrels required to produce such an extruded piece. In FIGURE 11, the multiple mandrels are cross hatched from upper left to lower right to denote the stem pieces. It will be understood by those skilled in the art that the shape of the extruded piece may be modified greatly without violating the nature of the invention here described.

In operation, material to be extruded is placed within the space defined by wall 2 of containing ring 1. Ram 3 applies pressure upon the material to be extruded through buffer 3a, which is fitted into containing ring 1 in such a way as to prevent the escape of material in a retrograde direction, a further function of buffer 3a being to equalize pressures laterally. It will be understood that the material to be extruded is in the plastic state. The material to be extruded passes around the mandrel head (No. 12 in FIGURES 1, 2, and 5 and Nos. 21 and 22 in FIGURE 8) and around the mandrel stem (No. 13 in FIGURES 1 and 5 and Nos. 23 through 29 in FIGURE 8) and in this process the material passes through ports or open areas between the webbing bars, each of which is depicted in FIGURES 1 and 3 by webbing bar surfaces 9 and 11 and by mass of the webbing bar 10, and each of which webbing bars is partially defined in FIGURE 2 by upper surface 9. The depiction in FIGURE 5 will be separately described. The material to be extruded then passes into a mixing chamber defined by its wall and by its sloping bottom 4 and thence through die depicted by its bearing shoulder 5, which is supported by backing bearing 6, after which the material being extruded issues from the die depicted by its shoulder 5 as an extruded piece in the space defined by continuing backer 7. Webbing bars 9, 10, and 11 are backed by support 8 which may assume a plurality of configuration to permit the extrusion of a plurality of types of hollow shapes with appropriate webbing bars and mandrels fitted to a standard extrusion press. Within the mixing chamber and within the die depicted by its shoulder 5 is the stem of the mandrel 13. FIGURE 2 is a lateral cross section taken on section line 2—2 in FIGURE 1, from upstream which may be described as that direction from which the material being extruded flows. It shows webbing bar support 8, the mandrel head 12 (in this embodiment spherical) and the webbing bars themselves 9 on that side of the mandrel head away from the view.

In FIGURE 3 the exploded view shows the absence of mechanical means of adjustment by which the mandrel has been positioned in the prior art. The mandrel head 12, not shown, rests freely upon the webbing bars, and is not attached to them, shown by webbing bar surfaces 9 and 11 and mass 10. FIGURE 4 requires no detailed description, it showing the tube extruded with constant thickness walls.

In FIGURE 5, simplified by omitting the ram 3 and buffer 3a, that configuration of the invention which produces an off-centered extruded piece is shown. The webbing bars are shown on one side by surfaces 14 and 18, along with webbing bar mass 15. The webbing bars on the opposite side are shown by surfaces 19 and 20 and mass of webbing bar 16, it being obvious that the two sets of bars are not equal in dimensions. Mandrel head 12 is suspended off-center in the opening, and stem 13 passes through die depicted by its shoulder 5 at a position which is also off-centered in that opening. In this depiction container ring 17 holds the webbing bars in place without the support piece which in FIGURE 1 was given number 8. In this drawing and the other drawings which pertain to this configuration, the area of the ports through which the material to be extruded passes is eccentric in proportion to the degree of off-centering desired in the extruded piece.

FIGURE 6 is a lateral cross section looking from downstream which may be desecribed as that direction to which the material being extruded flows, taken on section line 6—6 in FIGURE 5. Stem 13 marks the mandrel. The cross hatched area, upper right to lower left, represents the solid cross section body of the extruded piece. Die, depicted by its shoulder 5, surrounds the extruded piece without cross hatching. The cross hatched area, upper left to lower right, represents the backing for the die and is in fact the major mass of the die.

FIGURE 7 is a lateral cross section looking from upstream and taken on section 7—7 in FIGURE 5. Container ring 17 surrounds the ports represented without cross hatching but further defined by webbing bars 16 and 14. Mandrel head 12, which is above the line of view, is shown in phantom lines, and mandrel stem 13 defines the shape of the cavity in the piece to be extruded. FIGURE 8 shows the mandrel head in cylindrical form, which is an alternative form to the spherical shape shown elsewhere, and combines this with a rectangular mandrel stem terminating in a plurality of mandrel stems. Cylinders 21 and 22, free to rotate in one direction on surface 21 but restricted from movement in all other directions, support the mandrel stem. The body of the mandrel stem in the area of the mixing chamber is defined by faces 23, 24, 25, 26, 27, 28, and 29, which set forth a shape sensitive to pressures within the material to be extruded. The body of the mandrel stem terminates in a plurality of end pieces at the position of the die, not shown, but which if shown would be depicted by the shoulder 5. The end pieces provide a multiplicity of cavities in a single extruded piece. See stems 31 and 32, separated by spacer 30, upstream.

FIGURES 9, 10, and 11 have been adequately explained previously in the overall statement of the drawings.

The mandrel consists of the stem 13 passing through a die depicted by its shoulder 5 and at that point determining the shape of the cavity in the hollow extruded shape, which stem is attached to a head, shown as either 12 or the combination 21 and 22. Stem and head are fabricated as a single piece. The spherical surface of ball 12 or cylinders 21 and 22 rests against the projecting webbing bars normally used in extrusion, numbers 9 et cetera, and is prevented from downstream movement by them. The material to be extruded passes around the mandrel and through ports created by the openings between the webbing bars. The material to be extruded then passes into a mixing chamber beyond the webbing bars and around the mandrel stem and within this space it creates pressures which determine the position of the stem at any given moment, laterally considered. A constant speed for the material being extruded is maintained, and the exact degree of centering or controlled off-centering of the stem is created by the rate of flow of the material being extruded. With a constant speed, the rate of flow is determined entirely by the cross section areas of the several ports. Thus the essence of the invention is in the use of no control of any kind except that which is provided by the controlled port areas which position the mandrel.

In the prior art, the mandrel is positioned by screws which must be kept tight. With variations in the temperature and pressure of the material being extruded, the die yields under pressure and deflects from its engineered position. Similarly, the screws yield and deflect, as does the mandrel itself. The three movements are both uncontrollable and unrelated. The combination of forces generated is constantly moving the mandrel from its desired position and changing the dimensions, shape, and position of the cavity in the piece being extruded. As distinct from the prior art, the present invention eliminates the mechanical means of adjustments and the three elements are free to automatically counterbalance each other in response to the dominant over-riding pressure from the material being extruded, this pressure being exerted on all sides of a predetermined position of the mandrel stem. The pressure also makes the stem of the mandrel remain parallel to the axis of extrusion.

In FIGURES 1, 2, 3 and 4, I have presented the case of the perfectly centered hollow extruded shape. One example of this is the tube. In experiments with the apparatus configured for perfect centering, the stem of the mandrel has been mechanically forced to an off center position and then released. Within a matter of a few seconds, the equality of the pressures generated within the mixing chamber around the mandrel stem by rate of flow control has returned the mandrel to the perfectly centered position as shown by wall thickness measurements on the extruded pieces. In FIGURES 5, 6 and 7, I present the case of the off-centered cavity which is produced when the stem of the mandrel is closer to one side of the aperture in the die than it is to the other. The precise position of the mandrel is determined by the ratios of the areas of those ports on one side of a straight line drawn longitudinally through the center of structure of the mandrel stem to the areas of those ports on the other side of the same straight line. It will be understood by those skilled in the art of extrusion that the straight line referred to above shall pass through the center of structure of the mandrel head as well as that of the stem and when it passes through the aperture of the die it shall be perpendicular to the upper plane surface of the die. The die and mandrel along with the webbing bars are to be fabricated in such manner as to permit the straight line to which reference is made.

As will be obvious from the drawings the bottom of the mixing chamber slopes inwardly from the containing ring to the die, this slope designed to permit extrusion at pressures lower than would otherwise be required. In this context the term bottom implies nothing as to a vertical alignment of the parts, meaning instead the downstream side or that side to which the extruded material moves. The force vectors resulting from the impingement of the material upon the sloping surface require a lower component of pressure in the direction of extrusion than if the bottom of the mixing chamber were perpendicular to the axis of extrusion. The lower pressure of extrusion makes the pressures created within the material extruded more sensitive to slight variations. This sensitivity provides more precise control of the position of the mandrel stem. This configuration becomes a preferred embodiment of the invention using the self adjusting mandrel.

Finally, in FIGURES 8, 9, 10 and 11, I present the mandrel with multiple terminal stems, all passing through a single aperture of a die to produce a single extruded piece with more than one cavity, or each one of the multiplicity of mandrel terminals passing through a distinct aperture adapted to that mandrel stem, this configuration to produce either the single piece with more than one cavity or a multiplicity of pieces, each with a single cavity. In both cases cited, the webbing bars are so fashioned that a number of mandrel heads can be in contact with the upstream surface of the webbing bar complex at predetermined posions, or alternatively a single mandrel head carries upon it a number of fashioned stems, all of which branch out from a single stem portion at a point downstream in terms of extruded flow from the webbing complex to which reference has been made.

FIGURE 8 depicts in perspective such a mandrel with a cylindrical head and two stems. The die assembly is not shown. FIGURE 9 depicts the cross section of the piece extruded from a mandrel complex of three stems, the cross section being taken at the point at which the piece issues from the die. FIGURE 10 shows the shape of the aperture in the die to be used for the extrusion of the piece shown in FIGURE 9. FIGURE 11 shows the cross section of the mandrel complex as it appears at the upper surface of the webbing bar complex which has been described. In this figure the solid part of the mandrel stem is shown by the cross hatching, upper left to lower right.

Although I have herein described my invention in what I conceive to be the practicable embodiment, I recognize that within the scope of the invention certain departures may be made. These departures are not to be considered as being beyond the claims hereinafter set forth.

I claim:

1. Apparatus for extruding hollow shapes in metals to controlled and constant dimensions, said apparatus to be used in general with conventional extrusion equipment, said apparatus consisting of a cylindrical mixing chamber with an opening in one end for the entrance of material to be extruded, the opposite or downstream end sloping inwardly to a central opening containing a die means, webbing bars projecting inwardly from the downstream portion of the walls of the mixing chamber and in so doing preventing longitudinal movement of a mandrel, the tip of which protrudes through the die means, there being at least one of such mandrels, each said mandrel having a head which is wider than any single opening between the webbing bars, each said head being fashioned with spherical curvature on at least the downstream face thereof, and each mandrel stem defining by its precise shape and dimensions a cavity of the hollow extruded piece, said webbing bars so fashioned as to leave between them ports which in their several cross sectional areas are precisely proportional to the desired lateral displacement in a constant attitude of the mandrel stem, said displacement to be to a position of equilibrium with the rheological forces present.

2. Apparatus for extruding hollow shapes in metals to controlled and constant dimensions, said apparatus to be used in general with conventional extrusion equipment, said apparatus consisting of a plurality of separate and discrete mandrels, each according to claim 1, and each such mandrel passing through a separate and discrete aperture in the die means with appropriate adjustments of the webbing bars aforesaid and ports aforesaid, the same differentiated to permit the extrusion of a multi-cavity hollow shape.

3. Apparatus for extruding hollow shapes in metals to controlled and constant dimensions, said apparatus to be used in general with conventional extrusion equipment, said apparatus consisting of a cylindrical mixing chamber with an opening in one end for the entrance of material to be extruded, the opposite or downstream end sloping inwardly to a central opening containing a die means, webbing bars projecting inwardly from the downstream portion of the walls of the mixing chamber and in so doing preventing longitudinal movement of a mandrel, said mandrel consisting of a single head large enough so that there may be joined to it a plurality of mandrel stems, in common thereto, said mandrel head being wider than any opening between the aforesaid webbing bars, said mandrel head being fashioned with spherical curvature on at least the downstream face thereof, each mandrel stem attached to said head defining by its precise shape and dimensions a single cavity in the piece extruded, and said webbing bars so fashioned as to leave between them ports which in their several cross sectional areas are precisely proportional to such lateral displacements in a constant attitude as may be desired for the several mandrel stems, said displacement to be to a position of equilibrium with the rheological forces present.

References Cited by the Examiner

UNITED STATES PATENTS

| | | | |
|---|---|---|---|
| Re. 82 | 3/1946 | Hanson | 207—5 |
| 2,870,522 | 1/1959 | Hickman et al. | 207—5 |
| 2,964,178 | 12/1960 | Goldsmith et al. | 207—5 |

CHARLES W. LANHAM, *Primary Examiner.*

MICHAEL V. BRINDISI, *Examiner.*